United States Patent [19]

Vaughan

[11] 4,271,919
[45] Jun. 9, 1981

[54] AUGER ASSEMBLY MOVING DEVICE

[76] Inventor: Hugh R. Vaughan, Box 531, Yorkton, Saskatchewan, Canada

[21] Appl. No.: 44,719

[22] Filed: Jun. 1, 1979

[51] Int. Cl.³ ............................................. B60K 25/00
[52] U.S. Cl. ....................................... 180/16; 173/22; 280/43.21
[58] Field of Search ................... 180/11, 15, 16, 74, 180/19 R, 62, 298, 299; 173/22; 414/527; 280/43.21, 43.22

[56] References Cited

U.S. PATENT DOCUMENTS

| 2,818,139 | 12/1957 | Sutter | 180/15 |
|---|---|---|---|
| 3,199,621 | 8/1965 | Seaman | 180/74 |
| 3,520,374 | 7/1970 | Ebert | 173/22 |
| 3,779,328 | 12/1973 | Wollenburg | 180/15 |

Primary Examiner—John J. Love
Assistant Examiner—Randall A. Schrecengost
Attorney, Agent, or Firm—Stanley G. Ade

[57] ABSTRACT

Relatively heavy and large auger assemblies often used in present day farming are difficult to move and manoeuver around a farmyard or the like and it is not always convenient to hitch a tractor to such auger assemblies for relatively short distance moving. This invention includes a small wheel which is driven by an electric motor connected to the battery of the auger assembly and which can be raised and lowered manually out of and into contact with the ground and is situated on the auger assembly wheel axle. A small castoring wheel assembly supports the rear end of the auger assembly. When the small wheel is lowered into contact with the ground, the wheel may be rotated slowly by the electric motor thus enabling the auger assembly to be moved as desired. Directional control is by steering the rear end of the auger assembly manually, adjacent to where the switch is located to connect and disconnect the battery to the motor.

5 Claims, 6 Drawing Figures

U.S. Patent
Jun. 9, 1981
4,271,919
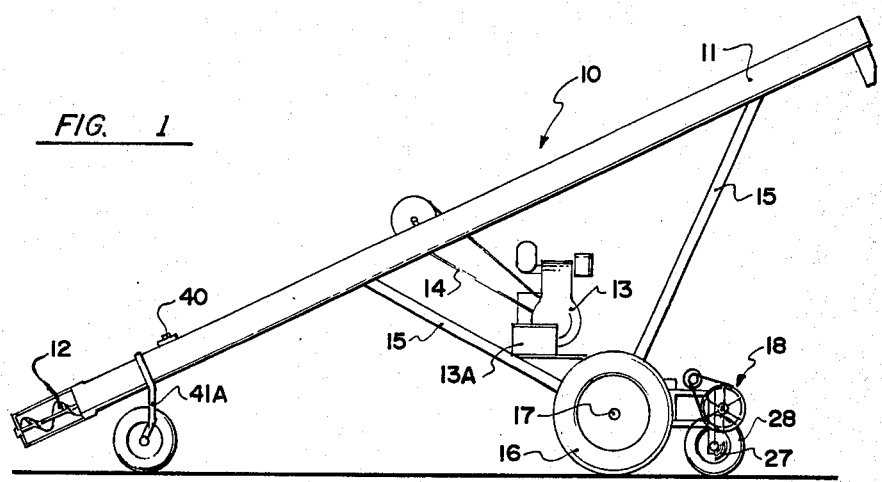
FIG. 1
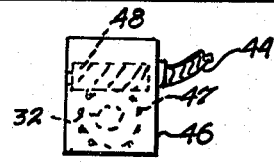
FIG. 6
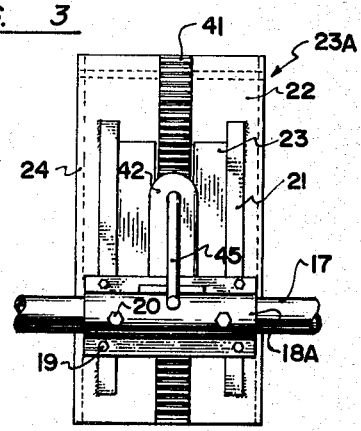
FIG. 3
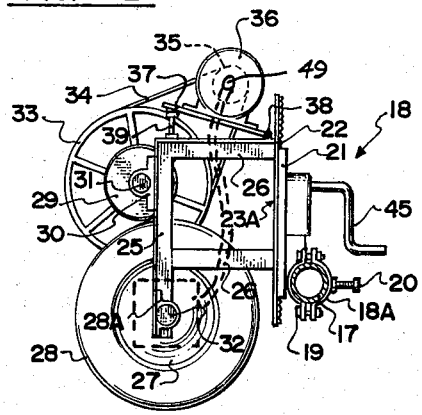
FIG. 2
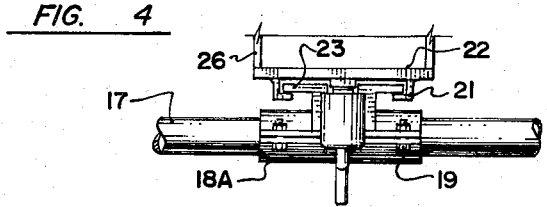
FIG. 4
FIG. 5

AUGER ASSEMBLY MOVING DEVICE

BACKGROUND OF THE INVENTION

This invention relates to new and useful improvements in devices for moving auger assemblies, particularly relatively heavy auger assemblies. It should be appreciated that the movement referred to is relatively small movements which may be required in or around a farmyard or the like and is not intended for long distance moving of the auger assembly under which circumstances it is usually hitched to a tractor or other source of motive power.

The relatively heavy auger assemblies used today in farming operations, are extremely difficult to manoeuver manually and it is obviously not always convenient or economical to hitch such auger assemblies to a tractor for the relatively small movement often required during the general operation of such auger assemblies.

SUMMARY OF THE INVENTION

The present invention overcomes these disadvantages by providing a drive attachment for auger assemblies which include a pair of ground engaging wheels mounted on a transverse axle and supporting an auger tube and auger flight assembly, a source of power for said auger flight assembly and a battery associated with said source of power; said drive attachment comprising in combination a drive wheel journalled for rotation adjacent said axle, means to rotate said drive wheel and means to raise and lower said drive wheel out of and into contact with the ground.

Another advantage of the present invention is to provide a device of the character herewithin described which is simple in construction, economical in operation and otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:

DESCRIPTION OF THE DRAWINGS

FIG. 2 is a side elevation of an auger assembly with the invention attached thereto.

FIG. 2 is a side elevation of the drive wheel attachment per se, attached to the transverse axle of the auger assembly.

FIG. 3 is an end elevation from the right hand end of FIG. 2.

FIG. 4 is a fragmentary top plan view of FIG. 3.

FIG. 5 is a schematic partially sectioned fragmentary view showing one method of raising and lowering the vertical plate.

FIG. 6 is a fragmentary side elevation of an alternative drive means to the ground wheel.

DETAILED DESCRIPTION

Proceeding therefore to describe the invention in detail, reference character 10 illustrates an auger assembly including an elongated cylindrical auger tube 11, an auger flight assembly therein indicated at the lower end thereof by reference character 12, a source of power 13 operatively connected to the auger flight by means of bolt 14, support arms 15 which are also used to raise and lower the auger assembly and ground engaging wheels 16, one of which is shown, mounted upon a transverse axle 17, all of which is conventional.

The invention collectively designated 18 is situated upon the axle 17 and is supported thereon by means of a cylindrical clamp assembly 18A surrounding the axle and being clamped in position by nut and bolt assembly 19. Set screws 20 engage through the cylindrical clamp assembly and engage the axle to prevent rotation of the clamp assembly.

A pair of vertically situated spaced and parallel guide channel members 21, are secured as by welding to the clamp assembly and extend upwardly therefrom, and a substantially vertically situated rectangular plate 22 is mounted for vertical movement within the guide channels by means of vertical portions 23 secured to the rear side of the plate 22.

A supporting frame collectively designated 23A extends upon the other side of the plate 22 and includes rear vertical angle iron members 24 or the like, front frame members 25 and transverse brace members 26, making a substantially open box-like frame upon the other side of the plate 22. Of course, it will be appreciated that other forms of supporting frame can readily be supplied.

A drive wheel 27 is journalled for rotation between the lower ends of the front vertical members 25, being mounted within bearings 28A, and this drive wheel is preferably rubber tired as indicated by reference character 28.

A drive roller 29 is journalled for rotation upon the members 25, within bearing 30, just above the drive wheel 27 and is in frictional engagement with the periphery of the tire 28. This drive roller is mounted upon an axle 31 supported within the bearing 30 and the drive wheel 27 is mounted upon an axle 32 supported for rotation within the bearings 28A.

A relatively large diametered belt pulley 33 is secured to one end of the drive roller axle 31 and is connected by means of a drive belt 34, to a smaller diametered pulley 35 driven by an electric motor 36.

This electric motor 36 is supported upon a support plate 37 upon the upper side of the supporting frame 23A and is adjusted vertically around a pivot point 38 by means of an adjusting bolt 39 operating in a conventional manner so that belt 34 may be tensioned as necessary.

The source of power 13 for the auger assembly includes a storage battery 13A and the electric motor is operatively connected to this storage battery via a conventional switch assembly 40 situated adjacent the lower end of the auger tube 11.

Means are provided to raise and lower the supporting frame 23A and hence the drive wheel 27 so that the drive wheel can be placed into contact with the ground or may be raised clear thereof.

In the present embodiment, a vertically situated rack 41 is either formed or secured to the rear side of the rectangular plate 22 and a gear box 42 is secured to the cylindrical clamp assembly 18A and extends upwardly therefrom.

A gear 43 is journalled for rotation within the casing 42 and engages the vertical rack 41 and means are provided to rotate this gear. In this particular embodiment, said means comprises a worm gear 44 secured to the inner end of a crank handle 45, the remainder of which extends externally from the casing so that rotation of the crank 45, rotates the gear 43 and hence moves the entire plate together with the supporting frame 23A and the drive wheel 27, upwardly or downwardly relative to the transverse axle 17.

Although the battery 13A is shown as a source of power for the drive wheel 27, nevertheless it will be appreciated that other sources of power such as 110-Volt V.A.C. may be provided, if necessary.

In operation, the lower end 12 of the auger assembly may be raised manually balancing the auger assembly around the wheels 16 whereupon switch 40 can be actuated to rotate the drive wheel 27 relatively slowly because of the reduction between pulleys 35 and 33. Steering is easily occasioned by moving the lower end from side to side as desired.

Although not absolutely necessary, it is desirable to provide a castor wheel assembly collectively designated 41A, and depending from adjacent the lower end 12 adjacent to the switch 40. This enables the lower end to be supported upon the castor wheel assembly thus eliminating the necessity to raise the lower end clear of the ground when it is desired to move the auger assembly from one place to another.

FIG. 6 together with FIG. 2 shows an alternative method of driving the ground wheel 28. In this particular embodiment, a small gear box 46 is secured to the frame and over the wheel axle 32 and a gear 47, within the gear box 46, is secured to the axle and rotates therewith. A worm gear 48 is also located in the gear box 46 and engages the gear 47 and a flexible drive shaft 49 extends between this worm gear 48 to the shaft 49 of the electric motor 36 thus eliminating the belt and pulley drive hereinbefore described.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A drive attachment for auger assemblies which include a pair of ground engaging wheels mounted on a transverse axle and supporting an auger tube and auger flight assembly, a source of power for said auger flight assembly and a battery associated with said source of power; said drive attachment comprising in combination a drive wheel journalled for rotation adjacent said axle, means to rotate said drive wheel and means to raise and lower said drive wheel out of and into contact with the ground, said drive attachment including a supporting frame mounted upon said axle, said drive wheel being journalled for rotation within said frame, said means to raise and lower said drive wheel out of and into contact with the ground including said frame being mounted for selective vertical movement upon said axle, said means to raise and lower said drive wheel out of and into contact with the ground including a pair of guide channels secured to said axle and extending vertically therefrom, a vertical plate secured to said supporting frame and engaging with said guide channels for vertical movement therein, a gear and rack assembly on said axle operatively connected to said plate to move same vertically and a hand crank operatively engaging said gear and rack assembly to operate same.

2. The attachment according to claim 1 in which said means to rotate said drive wheel comprises a roller journalled for rotation above said drive wheel and being in frictional contact with the periphery of said drive wheel, an electric motor, means selectively and operatively connecting said electric motor to said battery and means to operatively connect said electric motor to said roller.

3. The attachment according to claim 2 in which said roller is journalled for rotation within said supporting frame and said electric motor is also mounted upon said supporting frame.

4. The attachment according to claim 3 which includes a ground engaging castor wheel assembly secured to and depending from adjacent the lower end of said auger assembly.

5. The attachment according to claim 1 or 2 which includes a ground engaging castor wheel assembly secured to and depending from adjacent the lower end of said auger assembly.

* * * * *